(12) United States Patent
Tanaka et al.

(10) Patent No.: US 7,116,709 B2
(45) Date of Patent: Oct. 3, 2006

(54) COMMUNICATION METHOD OF CONTACTLESS ID CARD AND INTEGRATED CIRCUIT USED IN COMMUNICATION METHOD

(75) Inventors: Satoshi Tanaka, Kokubunji (JP); Tomoaki Ishifuji, Tokyo (JP); Kenji Nagai, Iruma (JP); Katsuhiro Furukawa, Ome (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/860,324

(22) Filed: Jun. 4, 2004

(65) Prior Publication Data
US 2004/0228400 A1      Nov. 18, 2004

Related U.S. Application Data

(63) Continuation of application No. 09/325,801, filed on Jun. 4, 1999, now Pat. No. 6,765,959.

(30) Foreign Application Priority Data

Jun. 5, 1998      (JP)      ................ 10-157144

(51) Int. Cl.
    *H03K 7/04*      (2006.01)
(52) U.S. Cl. .................................... 375/239
(58) Field of Classification Search ........... 375/238, 375/239, 226, 293, 287, 295, 340, 360, 316, 375/371, 350; 327/26, 36–50, 85, 141, 144, 327/165; 329/327, 341, 343
    See application file for complete search history.

(56) References Cited

U.S. PATENT DOCUMENTS

| | | | |
|---|---|---|---|
| 4,471,345 A * | 9/1984 | Barrett, Jr. | 340/572.1 |
| 4,481,658 A * | 11/1984 | Schmidt | 381/14 |
| 5,127,023 A * | 6/1992 | Tash et al. | 375/282 |
| 5,131,014 A | 7/1992 | White | |
| 5,166,676 A | 11/1992 | Milheiser | |
| 5,287,330 A * | 2/1994 | Gilmour | 367/103 |
| 5,313,198 A * | 5/1994 | Hirao et al. | 340/10.51 |
| 5,475,718 A * | 12/1995 | Rosenkranz | 375/376 |
| 5,502,711 A | 3/1996 | Clark et al. | |

(Continued)

FOREIGN PATENT DOCUMENTS

| | | |
|---|---|---|
| EP | 0 701 222 A2 | 3/1996 |
| JP | 56-23065 | 3/1981 |
| JP | 08-250686 | 9/1996 |
| JP | 10-013393 | 1/1998 |

OTHER PUBLICATIONS

1998 Symposium on VLSI Circuits Digst of Technical Papers, "A Coding Scheme for Field-Powered RF IC Tag Systems", S. Tanaka et al, pp. 230-231.

(Continued)

*Primary Examiner*—Emmanuel Bayard
(74) *Attorney, Agent, or Firm*—Mattingly, Stanger, Malur & Brundidge, P.C.

(57) ABSTRACT

The code system is realized by that a plurality of waveforms A and B each having duty ratios of 50% in which only any one of a rising edge and a falling edge is present are combined with each other, and "1" and "0" are allocated to the combined waveform. In accordance with the present invention, both a clock and data can be transmitted at the same time, and can be readily demodulated without using a complex PLL circuit. As a trial manufacture according to the present invention, the demodulator could be realized which could allow variations contained in an input frequency by more than 1 digit under operating voltage of 2 V. The effectiveness of this patent could be confirmed.

15 Claims, 14 Drawing Sheets

U.S. PATENT DOCUMENTS

| | | |
|---|---|---|
| 5,636,248 A | 6/1997 | Tash et al. |
| 5,726,630 A | 3/1998 | Marsh et al. |
| 5,780,828 A | 7/1998 | Mos et al. |
| 5,834,979 A * | 11/1998 | Yatsuka ................. 331/1 R |
| 5,850,161 A * | 12/1998 | Rhie ..................... 329/336 |
| 6,038,265 A * | 3/2000 | Pan et al. ............... 375/316 |
| 6,148,048 A * | 11/2000 | Kerth et al. ............ 375/350 |
| 6,166,606 A * | 12/2000 | Tsyrganovich ............ 331/25 |
| 6,308,554 B1 * | 10/2001 | Mattes et al. ............ 73/1.37 |

OTHER PUBLICATIONS

ISSCC97, "A Low-Power CMOS Integrated Circuit for Field Powered Radio Frequency Identification Tags", D. Friedman et al, pp. 294-295.

* cited by examiner

Figure 6
Waveform A
Waveform B
|  | 0 | 1 |
|---|---|---|
| Constant rising-edge period |  |  |
| |  |  |
| |  |  |
| |  |  |
| Constant falling-edge period |  |  |
| |  |  |
| |  |  |
| |  | 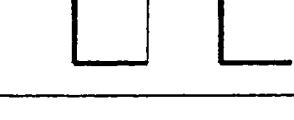 |

Figure 10
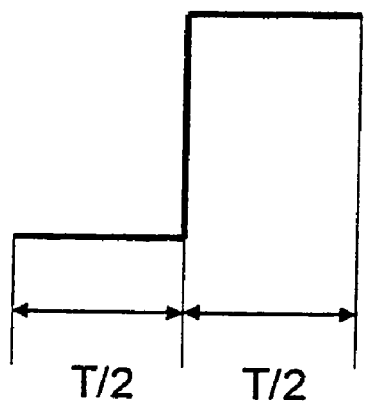
T/2   T/2
Waveform A
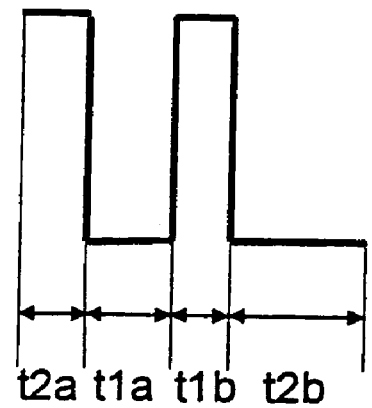
t2a  t1a  t1b  t2b
Waveform B

Figure 13
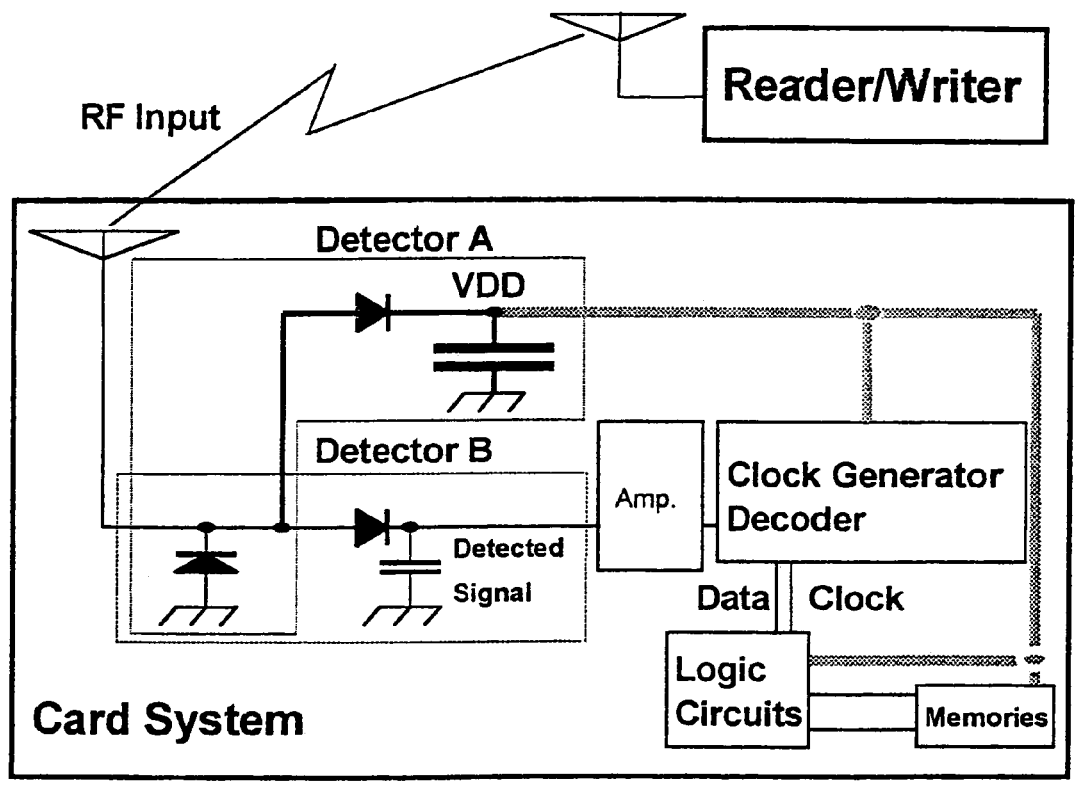
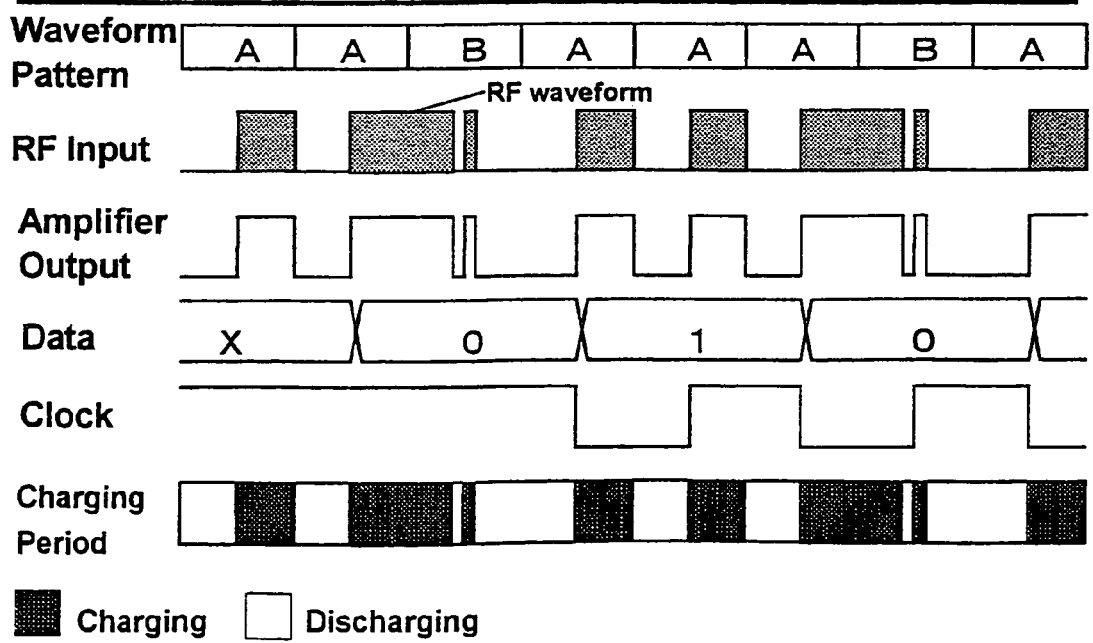

COMMUNICATION METHOD OF CONTACTLESS ID CARD AND INTEGRATED CIRCUIT USED IN COMMUNICATION METHOD

This is a continuation application of U.S. Ser. No. 09/325,801, filed on June 4, 1999 now U.S. Pat. No. 6,765,959.

BACKGROUND OF THE INVENTION

The present invention is related to a communication method of a contactless ID card and also to a circuit for realizing this communication method, and is to provide a communication method with employment of a code capable of readily separating data from a clock, and to provide a circuit for realizing this communication method, and further, to provide a transmitter, a receiver utilized in this communication method, and a communication system.

Very recently, a strong need is made to replace bar code systems by IC cards in view of information security, reliability, highly valuable services, and higher automatical operations. These bar code systems are utilized in magnetic cards such as cash cards and commuter passes, and also in logistic systems. These IC cards build an integrated circuits (ICs) therein. Among these cards, some cards are capable of transmitting/receiving data as well as capable of supplying electric power between data readers and these cards in the manner of electromagnetic waves, namely in the wireless manner without direct contact between them. These wireless cards are referred to as "contactless ID cards".

The contactless ID cards are classified into a close coupling type ID card used, while being coupled to a sensor; a proximity type ID card used, while being separated from a sensor by approximately 20 cm; and a remote type ID card used, while being separated from a sensor by approximately 50 cm. The close coupling type ID cards are mainly applied to credit cards. The proximity type ID cards are applied to commuter passes and ID cards. The remote type ID cards are applied to TAGs of logistic systems. The close coupling type ID cards and the proximity type ID cards receive supplies of information and electric power by way of mainly magnetic fields. The remote type ID cards receive supplies of these information and electric power by way of electromagnetic waves. Among 3 sorts of these contactless ID cards, in particular, the remote type ID cards own the following development problems since the received electric power is very weak. That is, more specifically, the remote type ID cards are operable under low power consumption, and also the electric power is supplied in high efficiencies.

FIG. 2 shows an example of a remote type contactless ID card system. An IC card is arranged by an antenna, a diode for detection, a diode for a power supply voltage generator, a preamplifier, a clock generator, a decoding circuit, a logic control circuit, a memory, a driving FET for answering, and so on. An amplitude modulation signal containing information of a clock and data is transmitted from a reader/writer. When a signal is received, electric charges are stored into a power capacitor, and then the IC card is operated by using a voltage appearing across the capacitor as a power supply voltage. The signal detected by a detector is separated into the data and the clock by the clock generator and the decoding circuit, which are processed by the logic control circuit. When the IC card sends the answer to the reader/writer, an impedance of the antenna is modulated by the driving FET for answering.

In the conventional remote type contactless ID card systems, the Manchester code is applied so as to communicate the data between the ID cards and the data readers/writers, as described in "A Low-Power CMOS Integrated Circuit for Field-Powered Radio Frequency Identification Tags", by D. Friendman et.al., IEEE ISSCC97, SA.17.5, 1997. FIG. 3 indicates a modulation waveform by the Manchester code. In the Manchester code, a transition from "H (high voltage)" state to "L (low voltage)" state is allocated to 1, and a transition from "L (low voltage)" state to "H (high voltage)" state is allocated to 0. When time of "H" is not equal to time of "L", namely a duty ratio is not equal to 50%, a DC offset is produced by data. When a level of a received signal is varied, or fluctuated, this fluctuation mainly causes reading errors. In accordance with the Manchester code, the time of "H" is set to be equal to the time of "L" so as to realize the signal having the duty ratio of 50%, and the code suitable for the communication is realized without the occurrence of the DC offset.

However, in order to decode the Manchester code corresponding to the above-described prior art, since "0" and "1" are determined based upon the appearing order of the H/L states, the respective H/L states are required to be detected. In other words, it is required to employ such a clock signal having a time period shorter than, or equal to a half time period of a single code. Also, as indicated in FIG. 3, since an interval between rising-edge transition timing and falling-edge transition timing is varied in accordance with data, the phase-locked loop and the oscillator are required so as to produce the clock signal, and convergence of clock requires lengthy time. The locking condition of the phase-locked loop is given by that the self-running frequency of the oscillator is defined within +50% and −50% of the frequency of the reference signal. To satisfy this condition, the temperature, the power supply voltage, and the process fluctuation of the device must be canceled, and a complex reference circuit is required, and thus, the consumed current is increased. In such a case that the communication is temporarily interrupted due to adverse influences caused by electromagnetic wave conditions, there is such a problem that the convergence of clocks is prolonged, and thus, lengthy locking time is required.

SUMMARY OF THE INVENTION

An object of the present invention is to provide a communication method, a circuit capable of realizing this communication method, and also to provide a transmitter, a receiver, and a communication system, which are used in this communication method, to reproduce a code without employing a complex phase-locked loop, to produce a reference clock of an integrated circuit provided on a card, and also capable of satisfying a duty ratio of 50%, and further, to provide a demodulating circuit for demodulating this code.

An object of the present invention is to provide a system.

The above-described objects are realized by that a plurality of waveform patterns each having a duty ratio of 50% are combined with such a waveform maintained in order not produce the same transition (rising edge, or falling edge) as that of a center of the waveform at a joint portion of the waveform, and by allocating "1" and "0". Either a rising edge or a falling edge appears at a near center of the waveform pattern.

BRIEF DESCRIPTION OF THE DRAWINGS

FIG. 6 shows a code list corresponding to the first embodiment mode.

FIG. 10 shows a code according to a third embodiment mode.

FIG. 13 indicates a fifth embodiment mode.

DETAILED DESCRIPTION OF THE EMBODDIMENTS

A detailed description thereof will be explained in the following embodiment modes.

Figure 1:
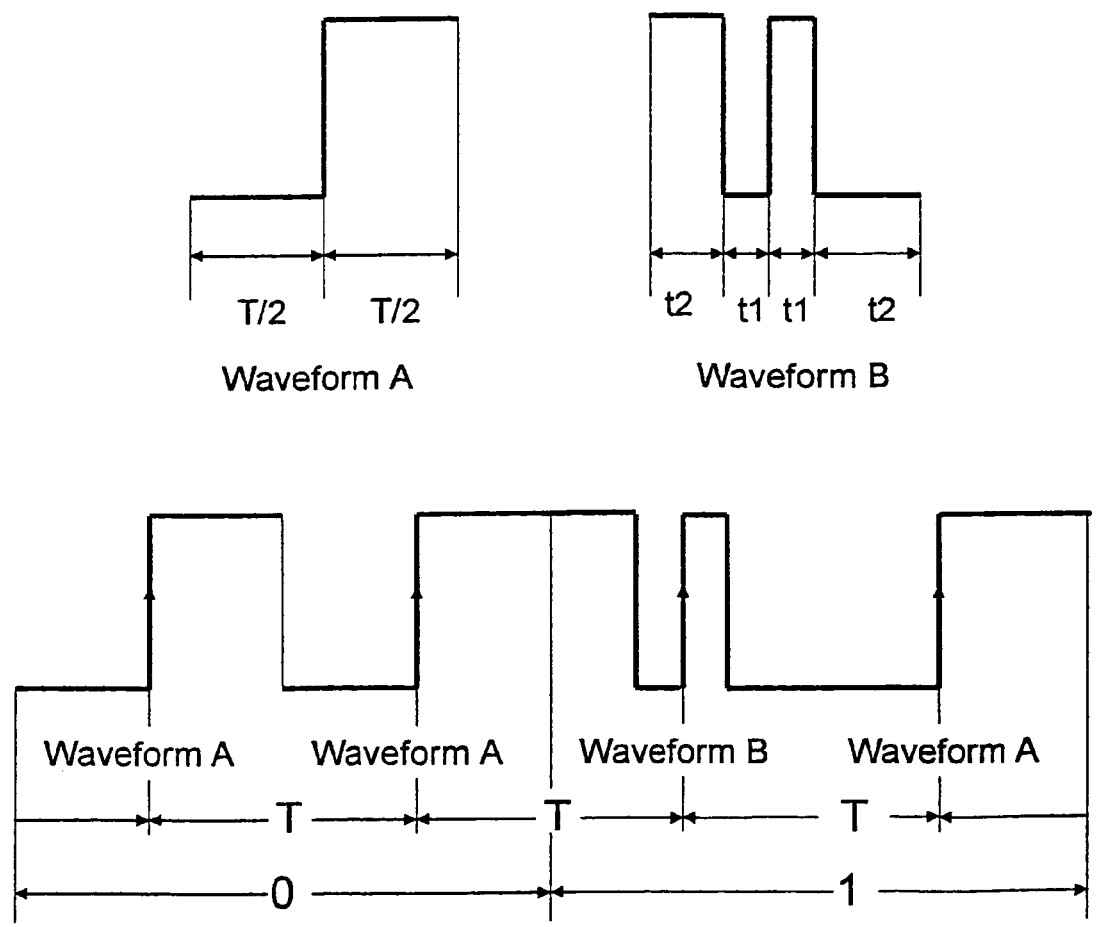
FIG. 1 shows a code according to a first embodiment mode.
Figure 2:
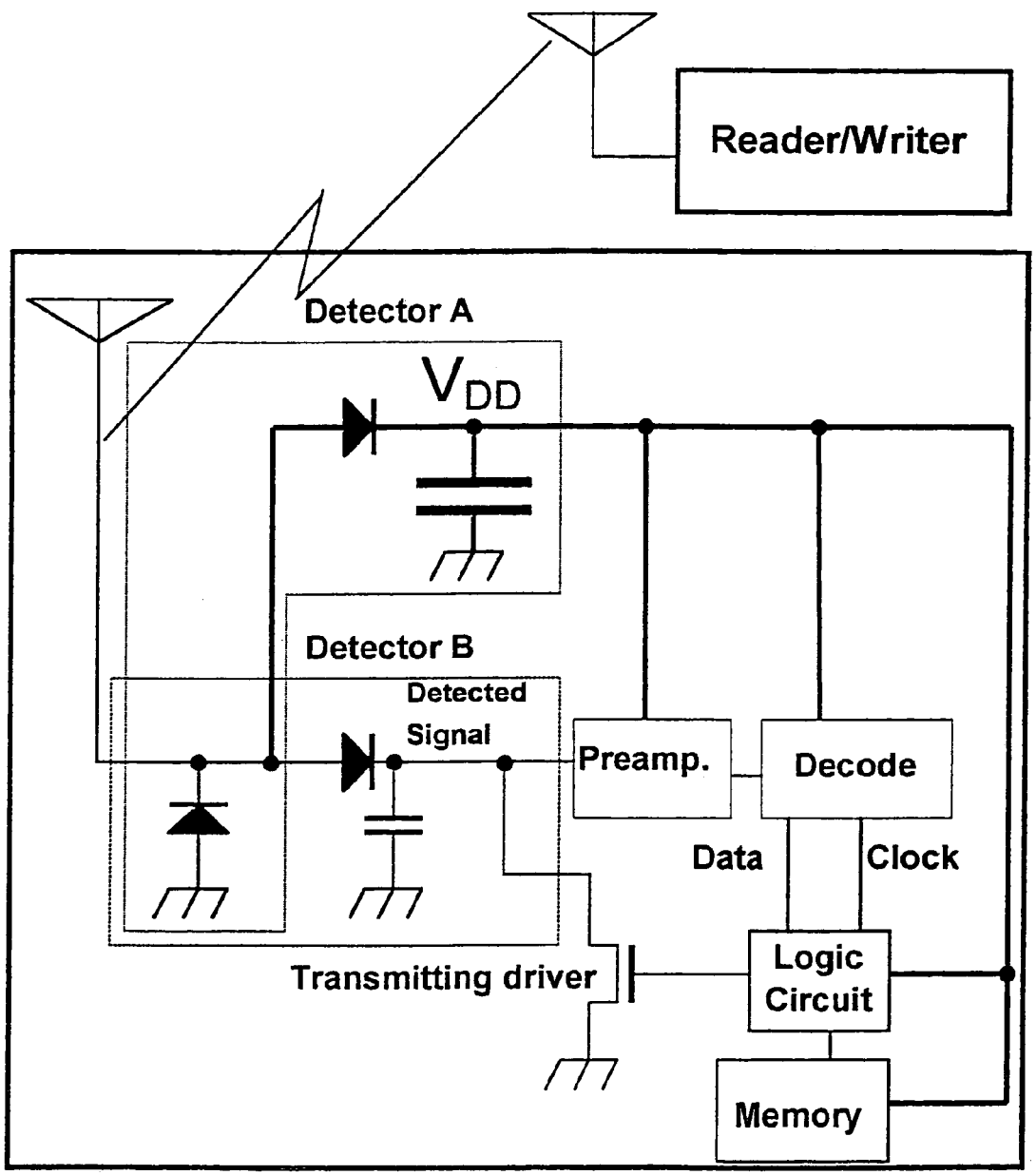
FIG. 2 is a block diagram for showing a general-purpose contactless ID card.
Figure 3:
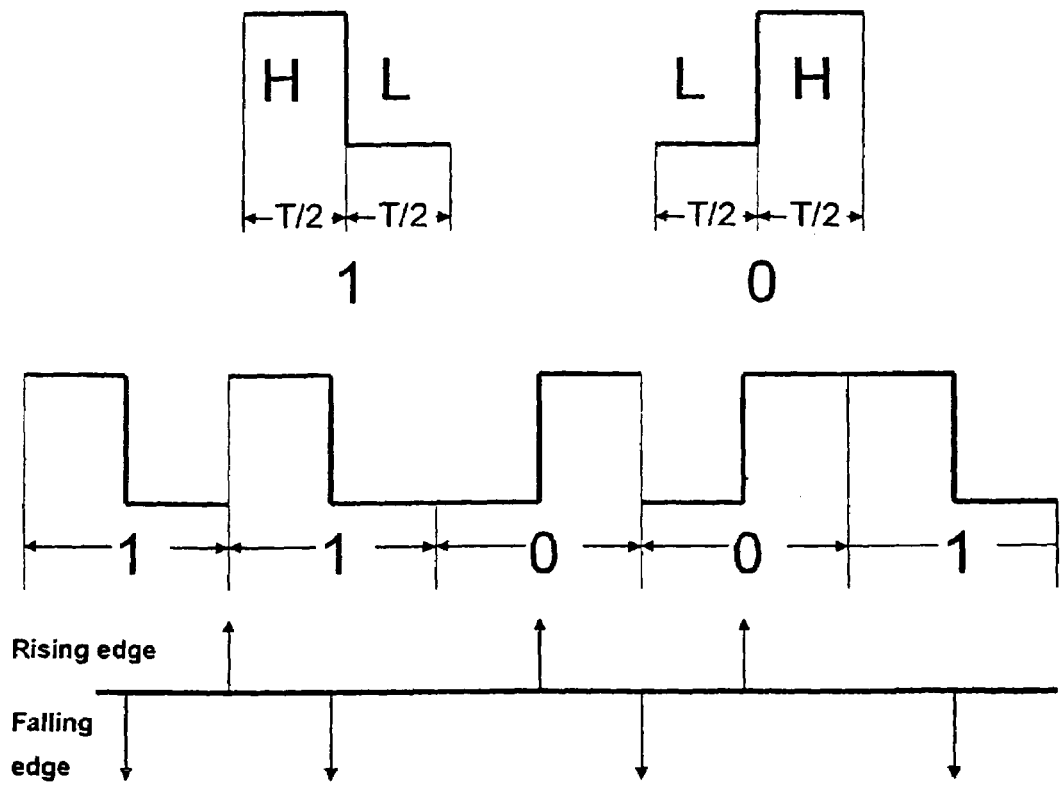
FIG. 3 shows the Manchester code waveform as the prior art.
Figure 4:
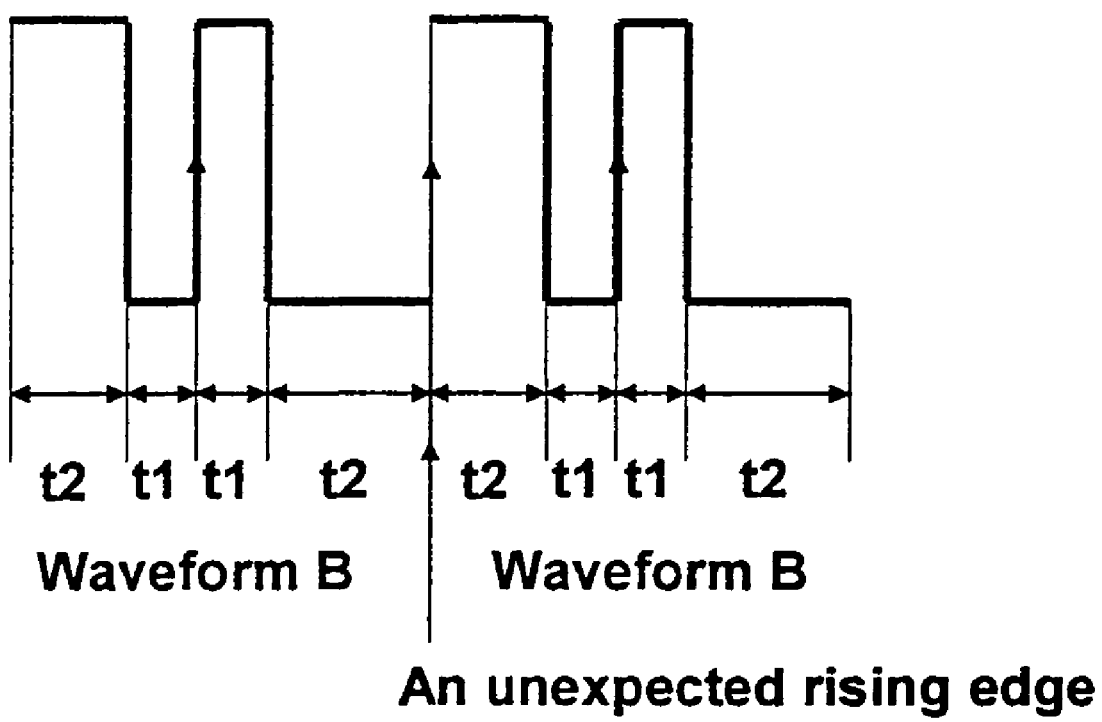
FIG. 4 explains a problem in the case that a waveform B is continued.

(1). A first embodiment mode of the present invention is shown in FIG. 1. In accordance with this embodiments, in a waveform to be transmitted/received, intervals of rising edges are set in equi-intervals. A waveform to be transmitted/received is obtained by combining, or synthesizing a waveform "A" with a waveform "B". The waveform A corresponds to such a waveform that an "H" state is extended by T/2 (symbol "T" being 1 time period) along a positive time direction, and an "L" state is extended by T/2 along a negative time direction from each of rising edge timing. The waveform B corresponds to such a waveform that an "H" state is held by time "t1" along a positive time direction from rising edge time, time "t2" up to a remaining center point is held under "L" state, an "H" state is held by "t1" along a negative time direction, and time "t2" up to a remaining center point is held under "H" state. In this case, it is assumed that t1+t2=T/2. As to both the waveform A and the waveform B, transitions of rising edges necessarily exist at centers thereof. It should be understood that when "0" and "1" are simply allocated to the waveforms A and B, as indicated in FIG. 4, in the case that the waveform B is continued, the rising edge transitions occur at connection portions of the waveform, and thus, it is difficult that rising edge timing may correspond to one piece of data. The reason why when the waveform B is continued, the rising edge transitions occur at the connection portions of the waveform is given as follows. That is, the waveform B is commenced at an H level, and is ended at an L level.

Figure 5:
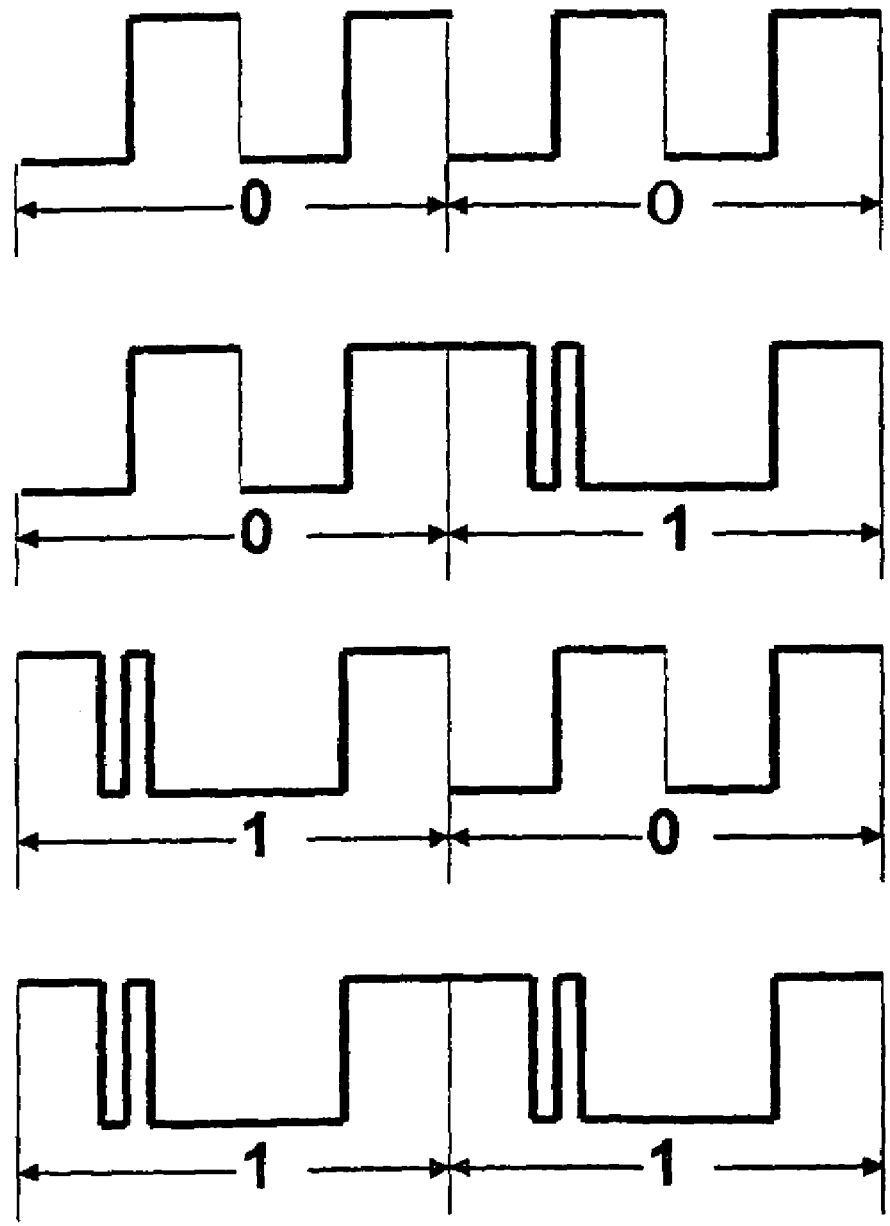
FIG. 5 represents a joint portion of codes according to the first embodiment mode.

It is now considered in this embodiment that such a case when a waveform "A" is continued two times is allocated to "0", whereas such a case when a waveform "A" is continued after a waveform "B" is allocated to "1". In this case, two continuous waveforms of a waveform "A" corresponding to "0" is commenced at an "L" level, and is ended at an "H" level, whereas a continuous waveform of waveforms B and A corresponding to "1" is commenced at an "H" level, and is ended at an "H" level. FIG. 5 represents all combinations of joint portions, possible 4 cases of 00, 01, 10, and 11. In the case of 00 and 10, a falling edge transition occurs. In the case of 01 and 11, an H level is maintained. As previously explained, even when waveforms corresponding to arbitrary 0, 1 series are arranged, there is no possibility that a rising edge transition is produced at a joint portion of the waveforms. As a result, a rising edge transition always occurs only at a center point of each of waveforms A and B. A clock signal in synchronism with data can be readily produced by employing a circuit for detecting a rising edge transition.

As illustratively shown in FIG. 6, combinations of waveforms A and B may be realized as various variations, for example, a waveform A is replaced by a waveform B, and also 1 is allocated to such a case that a waveform B is continued after a waveform A. A waveform combination in which an interval of rising edges is mode constant may be realized by combining a waveform pattern which is commenced at an L level and is ended at an H level with another waveform which is commenced at either an L level or an H level and is ended at the same level as that of the commencement. To make an interval of falling edges, such a waveform pattern which is commenced at an H level and is ended at an L level may be combined with another waveform which is commenced at either an L level or an H level and is ended at the same level as that of the commencement. In accordance with this embodiment, since 2 sorts of waveforms having duty ratios of 50% are combined with each other, 1/0 information can be simultaneously transmitted while an interval of either rising-edge time or falling-edge time is made equal. When transistors occurred in an equi-interval are used as a trigger, it is easily possible to obtain data in synchronism with data without using a phase-locked loop.

Figure 7:
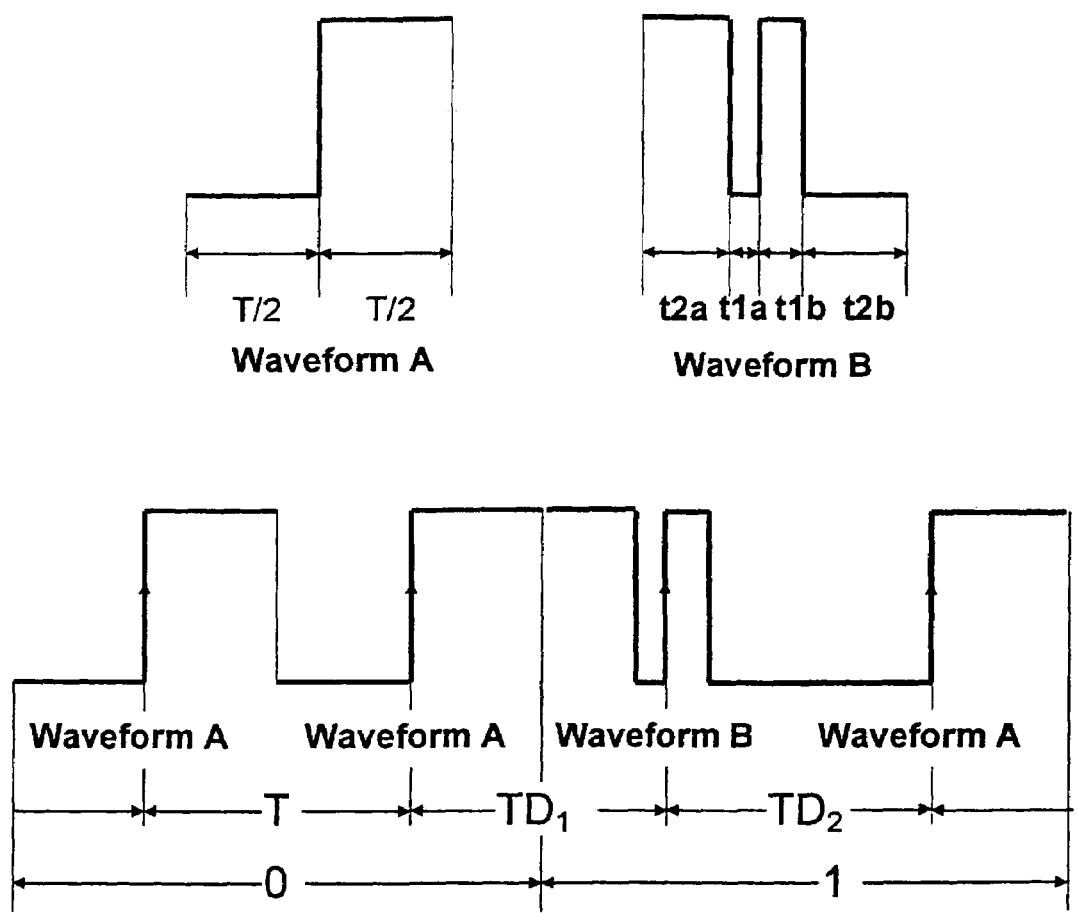
FIG. 7 indicates a code according to a second embodiment mode.

(2). FIG. 7 represents a second embodiment mode of the present invention. In the first embodiment, the interval of either the rising edge or the falling edges is fixed to a constant value. However, as to operation of a logic circuit provided on a card, rising-edge timing is not always set to the equi-interval. In FIG. 7, there is shown a waveform example such that although an interval of rising-edge timing is not equal to a constant, duty ratios of both a waveform "A" a waveform "B" may be maintained at 50%. In the waveform "B" shown in FIG. 7, such a relationship of "t2a+t1b=t2b+t1a" can be satisfied. Although the rising-edge time is shifted from a center point of a time period, the duty ratio of this waveform "B" is kept by 50%. In accordance with this embodiment, the following fact is revealed. That is, even when either the rising-edge timing or the falling-edge timing is not made constant, while the duty ratios can be maintained at 50%, the erroneous judgement for the amplitude variation can be minimized.

Figure 8:
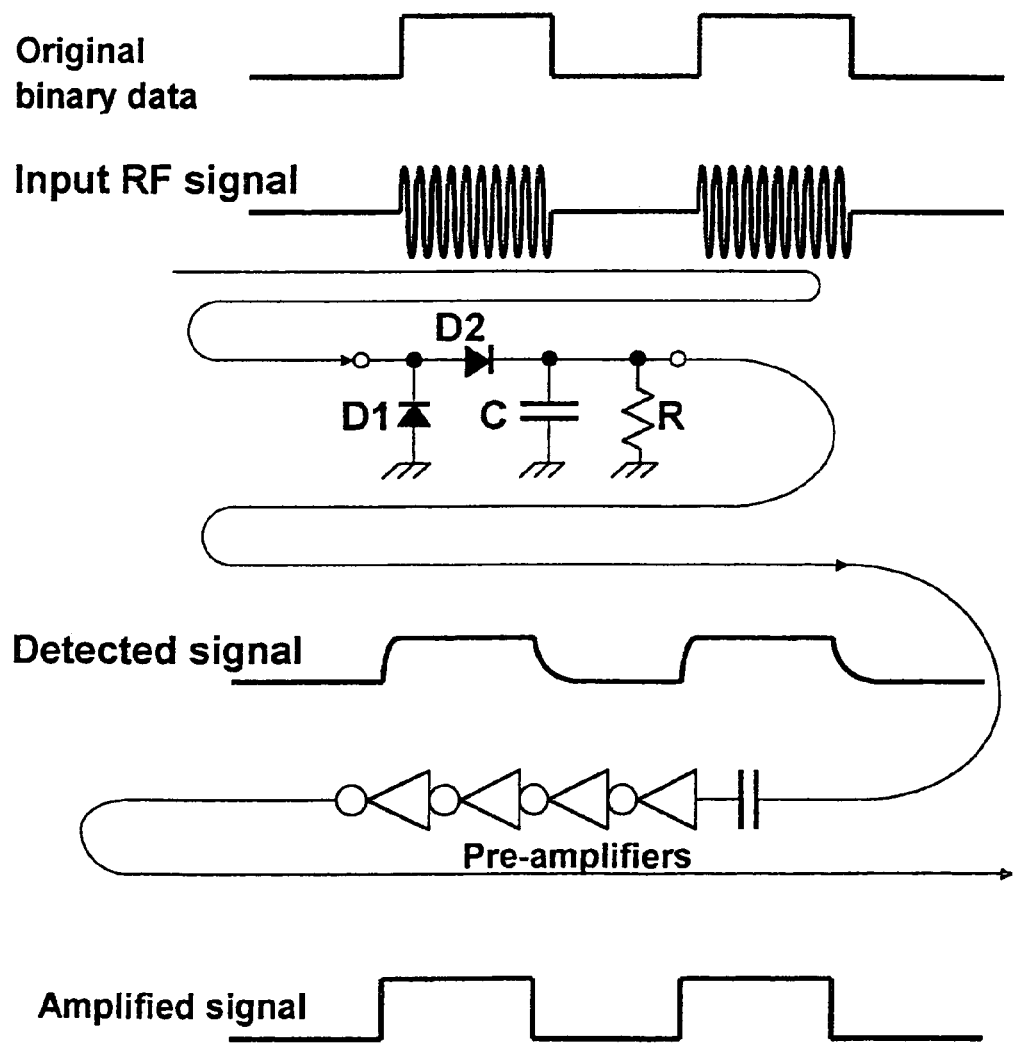
FIG. 8 is an explanatory diagram for explaining an operation of a card system detecting circuit.
Figure 9:
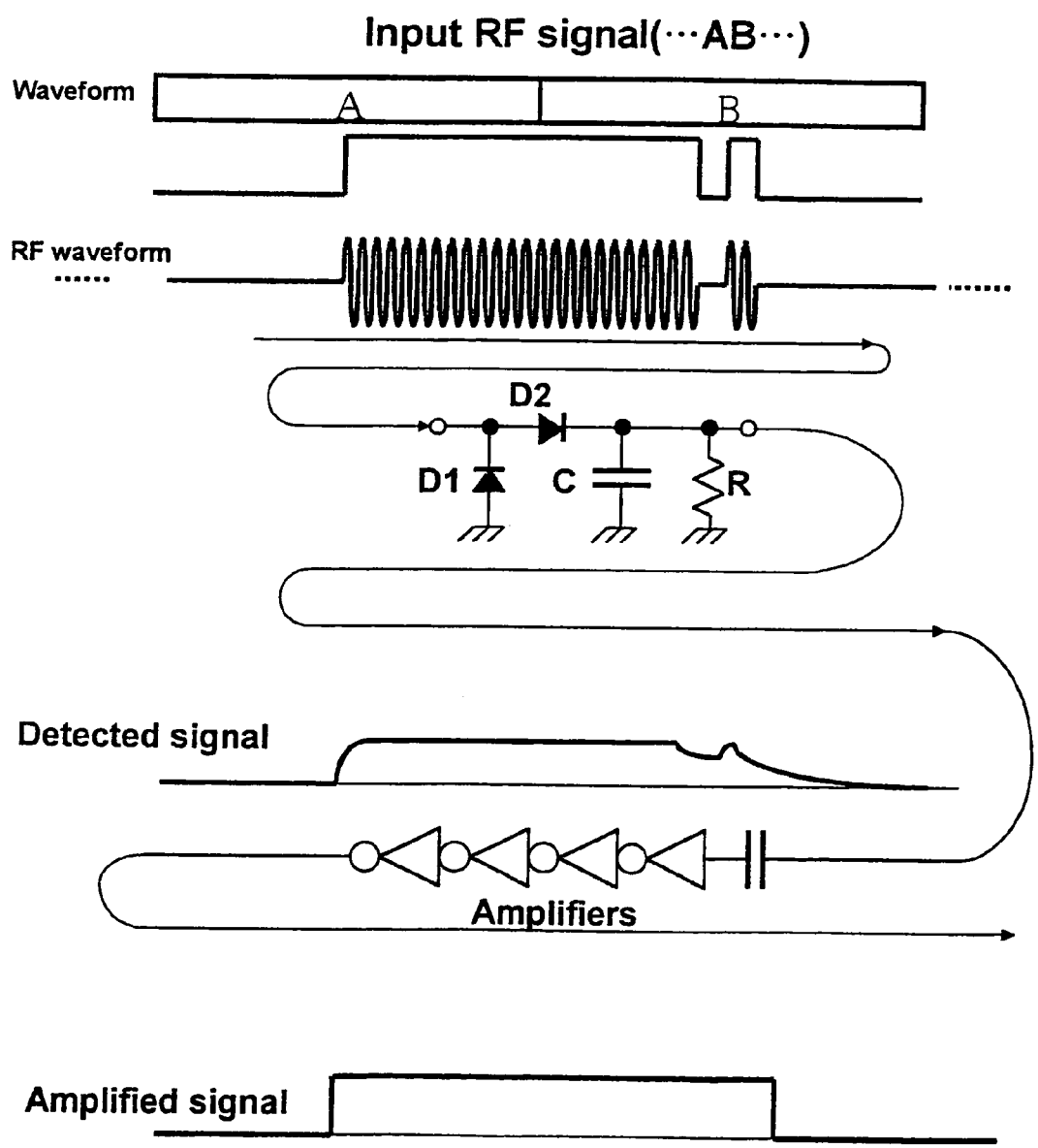
FIG. 9 represent a disappear of a waveform B caused by a non-linear characteristic of a detector.

(3). A third embodiment mode of the present invention will now be explained with reference to FIG. 8, FIG. 9, and FIG. 10. FIG. 8 schematically shows a detector of a card system. In this case, a diode functioning as a non-linear device is employed as a rectifier. A modulation system is an ASK (Amplitude-Shift Keying) system such that a carrier signal is transmitted under High state, and a carrier is stopped under Low state. The carrier is not completely stopped under Low state, depending upon a certain case, but there is another case that the carrier is transmitted in a low amplitude level. However, a difference between the above-explained two cases does not constitute an essential point in the following discussion. As indicated in the drawing, a modulated RF signal having a frequency of 2.45 GHz is detected by a half-wave rectifier arranged by a pair of two diodes D1 and D2, and then electron charges are stored into a capacitor C. The detected waveform is amplified by a preamplifier up to a CMOS logic signal level. The rising edge time of the detected output is determined by the RF frequency and an amount of current which can flow within one rectification process. To the contrary, the falling-edge time corresponds to such time that the electric charges stored in the capacitor C are discharged via a resistor R for discharging. The decision factors for the rising-edge time and also the falling-edge time are caused by the different aspects. To achieve the low power consumption operation, the resistor R has preferably a large resistance value. In this case, the falling-edge time is prolonged, as compared with the rising-edge time. A problem occurred when the rising-edge time is prolonged is indicated in FIG. 9. A specific problem occurs in the case that the waveform B is detected. An interval between a first falling-edge transition of the waveform B and a rising-edge transition of a center portion thereof is set to be shorter than another interval. When the falling-edge time is prolonged, the L-level can be hardly detected. To improve this problem, as previously described, the value of the resistor R must be decreased. However, this is not a preferable solution in view of the low power consumption. In this case, as indicated in FIG. 10, in order to correctly and essentially detect the waveform B, the time "t1a" is prolonged, as compared with the time "t1b". This waveform cannot satisfy the duty ratio of 50% during the transmission operation. However, the duty ratio of the detected waveform is approximately equal to 50%. In accordance with the waveforms of this embodiment, while these waveforms can respond to the asymmetrical response of the diode detector, the duty ratio of the transmission signal can be kept constant.

(4). A concrete circuit for decoding a code of the present invention is indicated as a fourth embodiment mode in FIG. 11. Also, operation timing of the circuit is shown in FIG. 12. The circuit is arranged by an inverter circuit used as a buffer; a low-pass filer constructed of a resistor R and a capacitor C; a latch circuit operated as a 1-bit A/D converter; a positive edge triggering circuit; and also a clock and data signal generator. A discrimination between a waveform "A" and a waveform "B" may be realized by such a way that an input signal is filtered by the low-pass filter, the latch circuit is driven at a rising edge of an original waveform, and a signal is detected. In the waveform A, since the long "L" state is present before the rising-edge timing, the latch output becomes "L". In the waveform B, after the long "H" state is continued before the rising-edge timing, the "L" state with the short time period is present, and thereafter the signal rises. As a result, if the time period of the "L" state is sufficiently shortened with respect to a time constant value of the filter, then the detection result becomes "H". The latch output is brought into the "H" state when the waveform B is received, and then becomes the "L" state at the timing when the next waveform A is received. This latch output signal is latched by the latch circuit of the post stage, and then outputted as an NB signal. The NB signal is outputted as a data signal at the rising-edge timing of the NE signal, and an inverted signal of this NE signal itself is used as a clock signal. The NE signal is given by OR-gating the NC signal and the ND signal. The NC signal becomes the "H" state at such rising-edge timing of the next waveform "A" when the waveform "B" is received. Subsequently, the "H" state and the "L" state are alternately outputted. As a consequence, the waveform "A" is always received at the rising-edge timing of the NC signal. The ND signal becomes the "H" state at such timing of the next waveform A when the waveform B is newly received from the reset state, and thereafter, the "H" state is maintained. In accordance with this embodiment, the clock can be discriminated from the signal by such a simple circuit without using a phase-locked loop.

Figure 11:
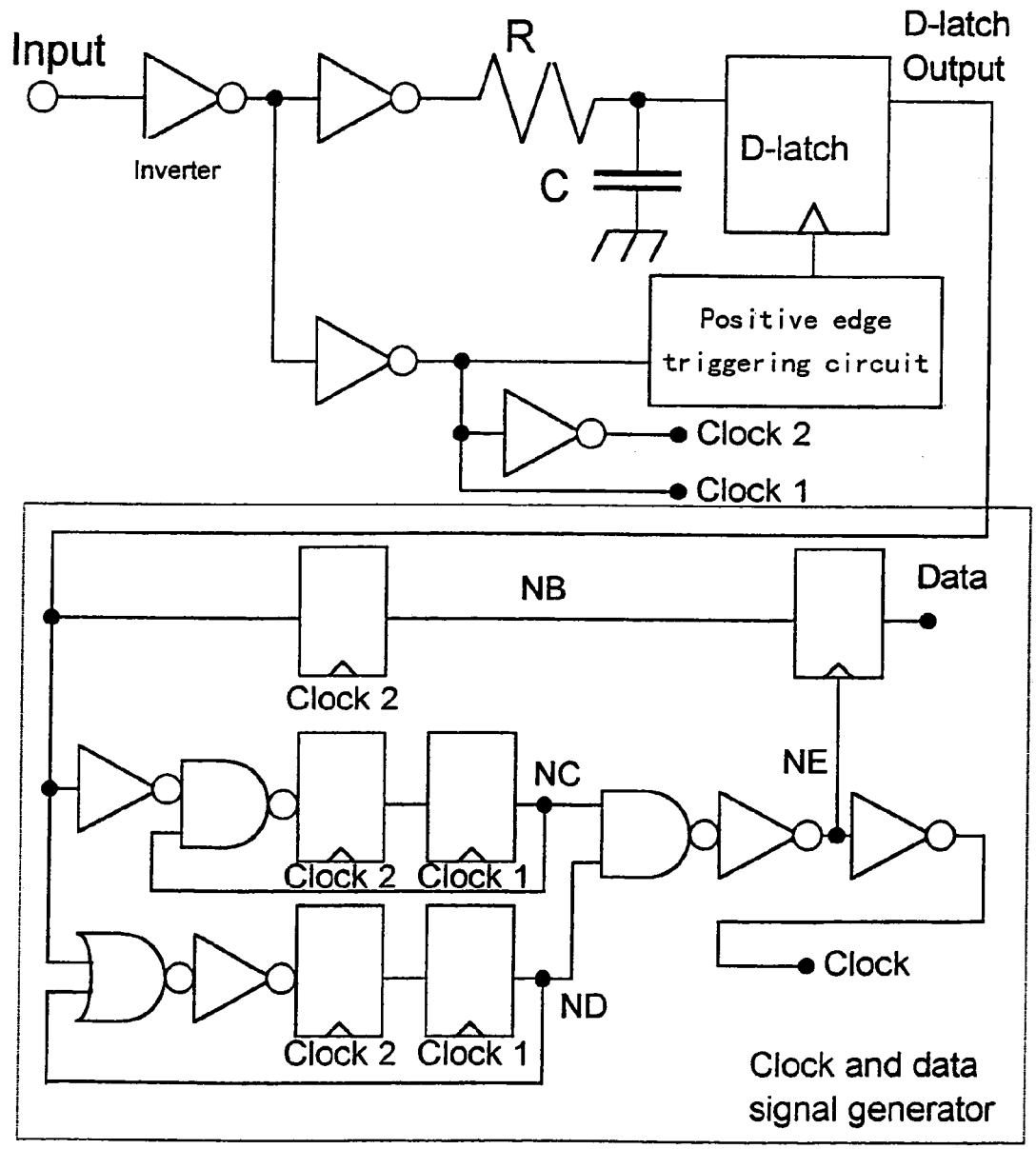
FIG. 11 indicates a demodulating circuit according to a fourth embodiment mode.
Figure 12:
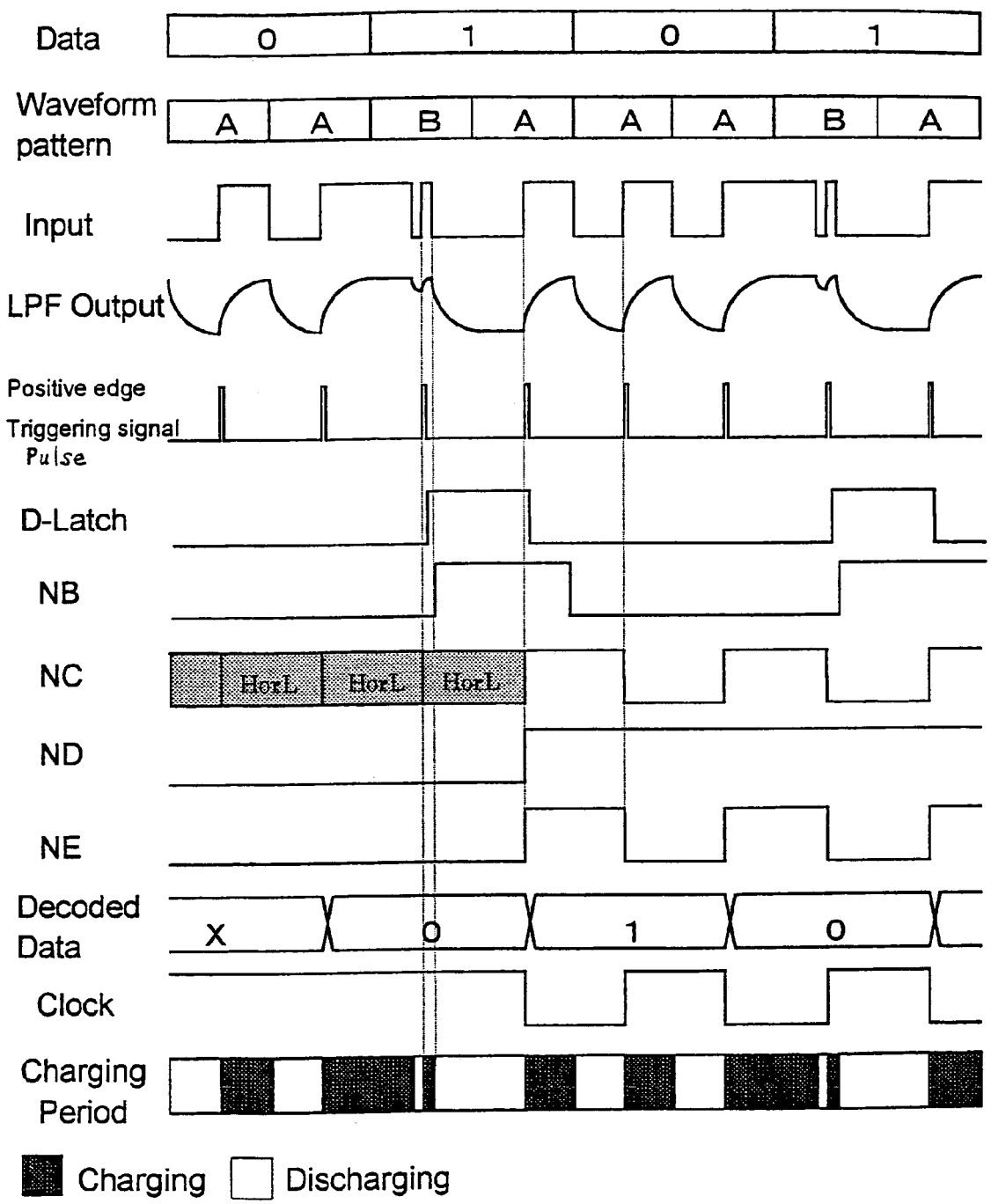
FIG. 12 shows a timing waveform of the demodulating circuit according to the fourth embodiment mode.

Furthermore, there is a secondary effect achieved by the embodiments shown in FIG. 11 and FIG. 12. This effect will now be described more in detail as a fifth embodiment with reference to FIG. 13. FIG. 13 represents a card system and operation timing thereof. As shown in FIG. 6, the waveform patterns of this present invention own various selection possibilities. In particular, in accordance with this embodiment, such a pattern that rising-edge transitions appear in an equi-interval is employed. As previously explained with respect to the third embodiment mode, a modulation system employed therein is the ASK (Amplitude-shift Keying) system such that the carrier signal is transmitted under High state, and the carrier is stopped under Low state. As a result, as a consequence, only in the case that an "High" signal is received by the card, electric power is supplied to this card from a reader/writer. In this embodiment mode, a clock signal is used in which a transition is produced at rising-edge timing of a reception signal. Most of the logic circuit and of the memory circuit are operated by using as a trigger, either rising-edge timing or falling-edge timing of a supplied clock signal. As a result, if the card system is operated at timing shown in this embodiment mode, when most of the circuit is operated, the card is energized by the reader/writer. The voltage variations of the power supply can be suppressed, as compared with such a case that the operation timing of the circuit is not made coincident with the supplying timing of electric power. Also, in particular, when the card system is synchronized with the rising-edge signal of the clock, since the circuit is not operated after the rising-edge timing of the waveform "B" at which the supply of electric power is decreased, a further great advantage can be achieved. As previously explained, in accordance with this embodiment, since the voltage variations of the power supply are reduced, the margin with respect to the minimum operation voltage can be secured, and also the useable distance can be increased.

Figure 14:
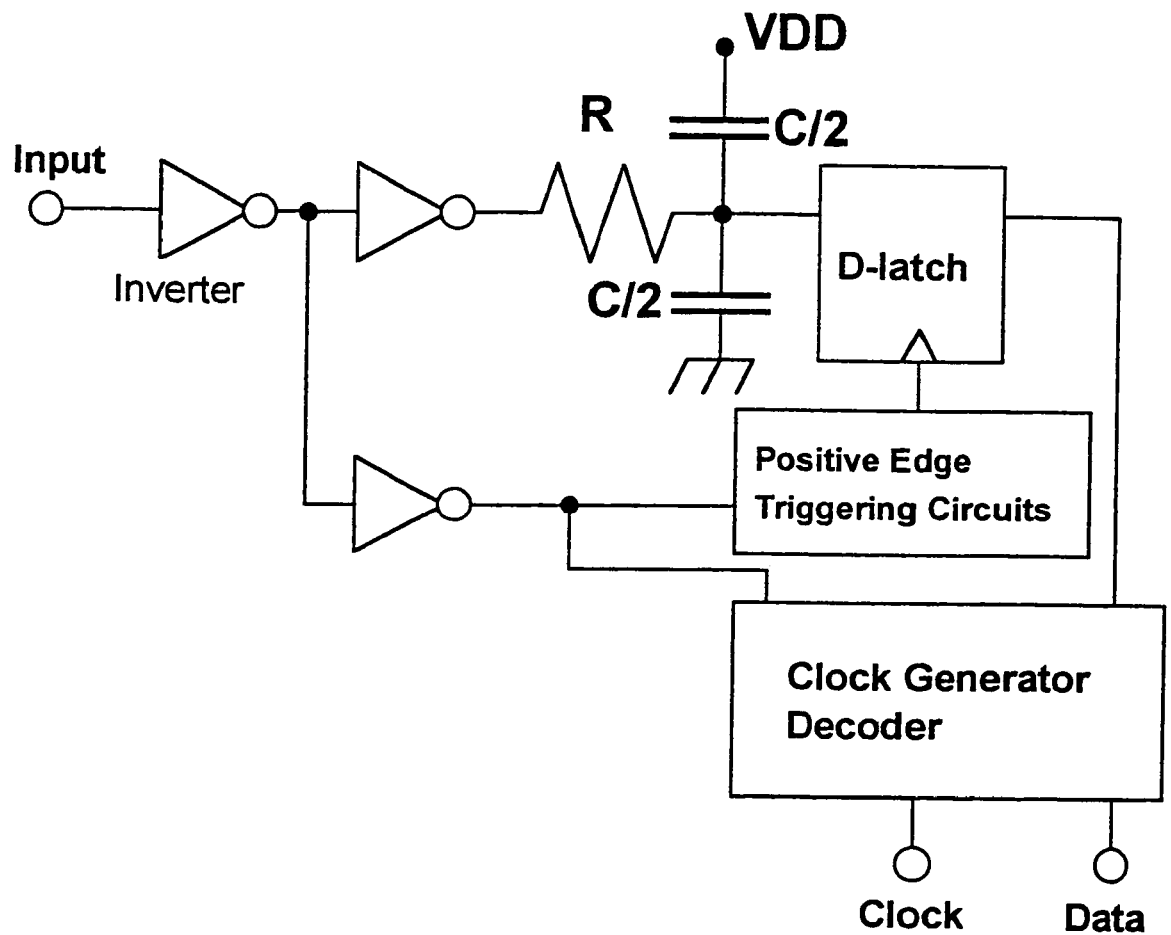
FIG. 14 indicates a sixth embodiment mode.

A sixth embodiment mode of the present invention will now be explained with reference to FIG. 14. This embodiment may reduce an adverse influence given to a decoder when a power supply voltage is varied. As previously explained, the card system without having the cell detects the signal and smoothes the detected signal so as to obtain the power supply voltage. As a result, the power supply voltage is readily varied, depending upon operation conditions of the circuit. When this voltage variation is transferred to the decoding circuit shown in FIG. 10, the logic threshold value of the inverter circuit for driving the LPF, and the logic threshold value of the D-latch circuit for sampling the signal are varied due to the voltage variation. Since the signal is delayed by the LPF, a delay is produced in the transfer of this voltage variation at the output unit of the LPF, namely the input unit of the D-latch circuit, so that this may cause the erroneous judgement of the data in the D-latch circuit. To avoid this delay, as indicated in FIG. 14, the capacitance of the LPF is subdivided into two capacitances which are then connected to both the ground terminal and the power supply terminal. As a consequence, since the variations contained in the power supply voltage are simultaneously transferred to all of the inverter, the LPF output terminal, and the D-latch circuit, the erroneous judgement can be reduced.

In accordance with the present invention, both the clock and the data can be simultaneously transmitted, and can be readily decoded without using such a complex PLL circuit. The effects of the respective embodiments may be summarized as follows:

(1). While satisfying the condition of the 50%-duty ratio capable of minimizing the erroneous judgement caused by the amplitude variation, either the rising-edge timing or the falling-edge timing is made as the equi-interval, and such a code can be realized without employing the complex synchronization loop, by which both the data and the clock produced in synchronism with this data can be extracted.

(2). The respective embodiments indicate that the code capable of satisfying the 50%-duty ratio can be realized even when the timing intervals are not made equal to each other.

(3). The respective embodiments indicate such a method that rising edge/falling edge characteristic of the diode detecting circuit, the duty ratio is intentionally shifted from the 50%-duty ratio, and after the detection, the duty ratio becomes 50%.

(4). The circuit for realizing the decoding operation of the proposed code and also the extracting operation of the clock is realized only by the low-pass filter and the logic circuit.

(5). The respective embodiments realize that the variations contained in the power supply voltage are minimized, the margin with respect to the minimum operating voltage is secured, and the useable distance is increased.

The decoding circuit with less erroneous operation with respect to the variations contained in the power supply voltage is realized.

To investigate the present invention, a test chip was trial-manufactured by way of the 0.8 μm CMOS standard process. The trial-manufactured chip contains all of the circuits except for the memory and the diode for detection. The RC filter provided in the demodulating circuit was also manufactured as the integrated circuit.

To evaluate margin with respect to element fluctuations of the integrated RC filter, while the ratio of t1/t2 of the waveform "B" shown in FIG. 1 is kept by 4, the transfer speed is varied, the following confirmation was made. That is, the decoder was operated under better conditions within such a range defined from 60 Kbps to 1.16 Mbps under condition of 2 V and 30 deg. C. As a result, it could be confirmed that sufficient margin could be obtained with respect to the fluctuations in the element value.

TABLE 1

| Technology | 0.8 μm CMOS |
|---|---|
| Number of gates | 3.7 kGate + Analog |
| Power consumption | 80 mW @ 2.0 V, 25 deg. C. |
| Operating voltage | 1.8 V @ 0.1 Vpp Input |
| | 1.6 V @ 1.6 Vpp Input |
| Operating temperature | −10, 90 deg. C. @ 0.1 Vpp Input |
| | −30, 90 deg. C. @ 1.6 Vpp Input |
| Allowed Vth variation | ±0.1 V |
| Clock frequency | typ: 200 kHz |
| Data rate | typ: 200 kbps |

To reduce the signal bandwidth, while the ratio of t1/t2 is kept by 4, when the transfer speed is varied, it could be recognized that the decoder was operated under better conditions within a range defined from 150 Kbps to 2.9 Mbps under condition of 2 V and 30 deg. C. Also, when the bandwidth is reduced, it could be recognized that the decoder was operated under stable condition.

The evaluation result about the entire test chip is listed in a table 1.

The following operations could be confirmed under Vth variation +0.1V and −0.1V by process variations, within a temperature range between −10 deg. C and 90 deg. C, and within a power supply voltage range from 1.8 V to 7 V. That is, with respect to an input of 0.1 Vpp, the decoder was operated with the error rate less than $10^{-6}$. When the amplitude of the input signal was increased up to the power supply voltage level, the confirmation was made that the decoder could be operated even under −30 deg. C and 1.6 V power supply. The consumed current may depend upon the operating condition. The confirmation was made that the current from 15 μA to approximately 70 μA was consumed under such a condition the average current was 40 μA.

The system operation was carried out by way of the test board on which the diode and ROM were mounted. The electric power of 1 mW at 2.45 GHz, which is equivalent to the communication distance of 1.5 m was supplied to the diode detecting circuit. In this case, the diode detecting circuit owns the current supply capability of approximately 100 μA. Under this condition, such a confirmation was made that the test board was that the test board was operated without employing any external power supply. The effects of the present invention could be proved by way of the above-described experiments.

The invention claimed is:

1. A communication method for transmitting information by a wave form combined with either a first wave form or a second wave form, using a first waveform and a second waveform,
    wherein said combined plurality of waveform patterns has transitions of any one of rising edges and falling edges in approximately equi-intervals,
    wherein said combined plurality of waveform patterns keeps a constant duty independently of data signals to be communicated, and
    wherein in such a case that an observation is made of said combined waveform which is filtered by a low-pass filter at timing of said transitions, different logic levels can be monitored as to said first waveform and said second waveform,
    wherein said first waveform representing one level of data signal and said second waveform representing another level of data signal are formed by a combination of a plurality of wave form patterns having at center portions thereof, a transition of any one of a rising edge and a falling edge, and
    wherein for data communication carried out by employing said first waveform and said second waveform, said data communication is performed in such a manner that said one transition does not occur except for at center portions of the waveform patterns.

2. The communication method according to claim 1,
    wherein said transitions to be first waveform and said second waveform are the same ones as said rising edge and said falling edge.

3. The communication method according to claim 2,
    wherein with respect to plural sorts of first waveforms and second waveforms, which have the transitions commonly applied to any one of the rising edge and the falling edge, the following communication code is employed in which:
    the stage number of the transitions of the second waveform is larger than that of the first waveform;
    an initial state of the first waveform is equal to a first stage;
    a final state of the first waveform is equal to a second state;
    initial states of a plurality of said second waveforms are equal to initial states;
    final states of the second plural waveforms are equal to first states;

such the first waveforms which are continued more than two times are allocated to a first logic value; and a combined waveforms produced by combining the first waveform with such the second waveform which is not continued is allocated to a second logic value.

4. The communication method according to claim 3,
wherein such a communication code is employed in which that a waveform is made in correspondence to either the first waveform or the second wave form, in which a high level state thereof is extended by T/2 (symbol "T" being 1 time period) along a positive time direction and a low level state thereof is extended by T/2 along a negative time direction from each of the rising edge timing; such a waveform is allocated to either the first waveform or the second waveform, in which a high level state thereof is held by time "t1" along a positive time direction from the rising edge time, time "t2" up to a remaining center point is held under low level state; a low from the rising edge time, and time "t2" up to a remaining center point is held under high level state; and also such a condition of (t1+t2T/2) is applied.

5. The communication method according to claim 4,
wherein a communication code is employed, in which a rising edge is replaced by a falling edge, and a high level state is replaced by a low level state.

6. The communication method according to claim 4,
wherein a communication code is employed, in which a waveform is allocated to either the second waveform or the first waveform, such that a high level state thereof is maintained by time "t11" along a positive time direction from rising edge time, a low level state thereof is held by time "t21" along a negative time direction from the rising edge time, and time "t22" up to a remaining center point is held under high level state; and also such a condition of (t11+t22T/2) is applied, and also, another condition of (t12+t21=T12) is applied.

7. The communication method according to claim 6,
wherein a communication code is employed, in which a rising edge is replaced by a falling edge, and a high level state is replaced by a low level state.

8. An integrated circuit comprising:
a buffer circuit having an input terminal to receive an input data signal of said integrated circuit, a first output terminal, and a second output terminal to output the same signal as that of
said first output terminal thereof
a low-pass filter circuit having an input terminal and an output terminal, said first output terminal of said buffer circuit being connected to said input terminal of said low-pass filter circuit;
a latch circuit having a first input terminal, a second input terminal, and an output terminal, said output terminal of said low-pass filter circuit being connected to said first input terminal of said latch circuit; and
a pulse generating circuit having an input terminal and an output terminal to provide said latch circuit with an edge trigger to drive said latch circuit, said second output terminal of said buffer circuit being connected to said input terminal of said pulse generating circuit, said output terminal of said pulse generating circuit being connected to said second input of said latch circuit,
wherein said latch circuit is configured so that an output of said pulse generating circuit may be inputted thereto through said second terminal thereof performing as a clock input terminal, to be driven at one of a rising edge and a falling edge of an original waveform of said input data signal,
wherein said integrated circuit is configured to be used in a communication method for transmitting information by a waveform combined with either a first waveform or a second waveform, using a first waveform and a second waveform,
wherein said combined plurality of waveform patterns has transitions of any one of rising edges and falling edges in approximately equi-intervals,
wherein said combined plurality of waveform patterns keeps a constant duty independently of said data signals to be communicated, and
wherein in such a case that an observation is made of said combined waveform which is filtered by a low-pass filter at timing of said transitions, different logic levels can be monitored as to said first waveform and said second waveform.

9. The integrated circuit according to claim 8,
wherein the low-pass filter circuit comprises a first resistor and a first capacitor,
wherein a first terminal of the first resistor is used as a first terminal,
wherein a second terminal of said resistor is connected to a first terminal of the first capacitor,
wherein a second terminal of said first capacitor is connected to the ground potential, and
wherein the first terminal of said first capacitor is used as an output terminal of the low-pass filter circuit.

10. The integrated circuit according to claim 8,
wherein the low-pass filter circuit is constituted by a first resistor and a second capacitor,
wherein a first terminal of the first resistor is used as a first terminal,
wherein a second terminal of said resistor is connected to a first terminal of a first capacitor,
wherein a second terminal of said first capacitor is connected to ground potential,
wherein the first terminal of said second capacitor is connected to the second terminal of the first resistor,
wherein a second terminal of said second capacitor is connected to a power supply potential; and
wherein the first terminal of said second capacitor is used as an output terminal of the low-pass filter circuit.

11. An integrated card system with employment of an amplitude modulation, wherein:
a transition of an internal clock occurs in synchronism with rising edge timing of a modulation signal,
an internal logic circuit is operated in synchronism with the transition of said internal clock,
said integrated card system is configured to execute a communication method for transmitting information by a waveform combined with either a first waveform or a second waveform, using a first waveform and a second waveform,
said combined plurality of waveform patterns has transitions of any one of rising edges and falling edges in approximately equi-intervals,
said combined plurality of waveform patterns keeps a constant duty independently of data signals to be communicated,
in such a case that an observation is made of said combined waveform which is filtered by a low-pass filter at timing of said transitions, different logic levels can be monitored as to said first waveform and said second waveform, said first waveform represents one level of data signal and said second waveform represents another level of data having at center portions thereof, a transition of any one of a rising edge and a falling edge, and for data communication carried out by employing said first waveform and said second waveform, said data communication is performed in such a manner that said one transition does not occur except for at center portions of the waveform patterns.

12. The integrated card system according to claim 11, wherein said transitions to be first waveform and said second waveform are the same ones as said rising edge and said falling edge.

13. The integrated card system according to claim 12, wherein with respect to plural sorts of first waveforms and second waveforms, which have the transitions commonly applied to any one of the rising edge and the falling edge, the following communication code is employed in which:

the plural sorts of the transitions of the second waveform is larger than that of the first waveform;

an initial state of the first waveform is equal to a first stage;

a final state of the first waveform is equal to a second state;

initial states of a plurality of said second waveforms are equal to initial states;

final states of the second plural waveforms are equal to first states;

such the first waveforms which are continued more than two times are allocated to a first logic value; and a combined waveforms produced by combining the first waveform with such the second waveform which is not continued is allocated to a second logic value.

14. The integrated card system according to claim 12, wherein such a communication code is employed in which that a waveform is made in correspondence to either the first waveform or the second waveform, in which a high level state thereof is extended by T/2 (symbol "T" being time period) along a positive time direction and a low level state thereof is extended by T/2 along a negative time direction from each of the rising edge timing; such a waveform is allocated to either the first waveform or the second waveform, in which a high level state thereof is held by time "t1" along a positive time direction from the rising edge time, time "t2" up to a remaining center point is held under low level state; a low from the rising edge time, and time "t2" up to a remaining center point is held under high level state; and also such a condition of(t1+t2T/2) is applied.

15. The integrated card system according to claim 14, wherein a communication code is employed, in which a rising edge is replaced by a falling edge, and a high level state is replaced by a low level state.

* * * * *